(No Model.)
N. DODD.
ATTACHMENT FOR INJECTORS.
No. 535,339. Patented Mar. 5, 1895.
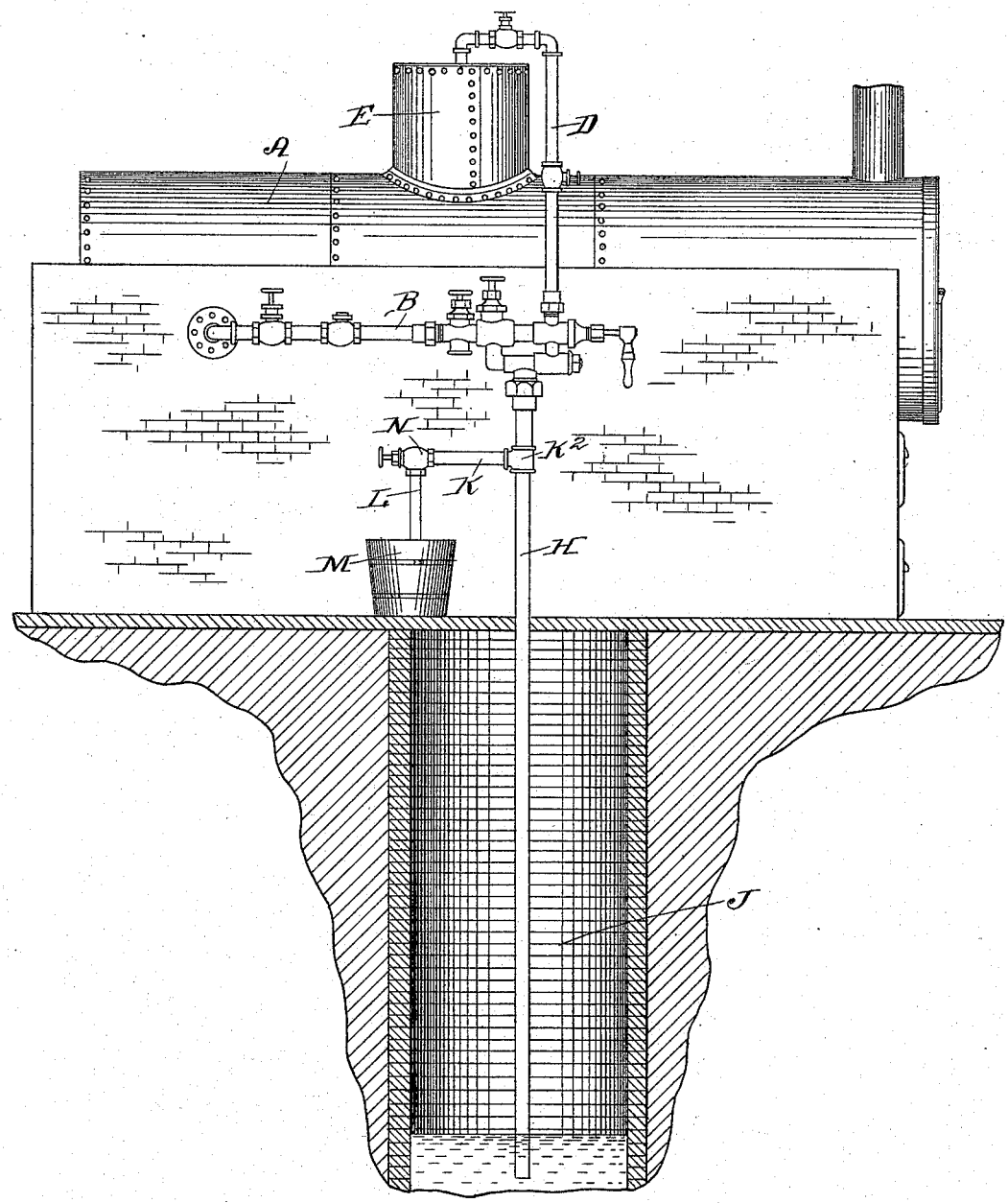
Witnesses
F. C. Tale
G. R. Green
Inventor,
Newton Dodd,
by Chas. C. Bulkley,
his Atty.

UNITED STATES PATENT OFFICE.

NEWTON DODD, OF DES MOINES, IOWA.

ATTACHMENT FOR INJECTORS.

SPECIFICATION forming part of Letters Patent No. 535,339, dated March 5, 1895.

Application filed March 12, 1892. Serial No. 424,623. (No model.)

*To all whom it may concern:*

Be it known that I, NEWTON DODD, a citizen of the United States, residing at Des Moines, in the county of Polk and State of Iowa, have invented certain new and useful Improvements in Attachments for Injectors, of which the following is a specification.

My invention has for its object the provision of means or apparatus by which the initial or preliminary operation of that instrumentality employed to elevate, convey or act upon a source of fluid supply by the creation of a vacuum, is greatly facilitated, resulting in economy and insuring automatically the prompt, immediate and ready response of said instrumentality in the accomplishment of the desired work, together with certain other specific advantages.

My invention consists in facilitating the preliminary or initial stage of operation of a hydraulic machine utilized to raise, convey, or transfer liquids by the creation of a vacuum, by first introducing into the hydraulic machine a column of liquid contained in an auxiliary or supplemental source of supply, which source is located at a point relatively nearer to the hydraulic machine than the main source of supply, whereby said hydraulic machine in its initial movements and preliminary formation of a vacuum acts upon the body of liquid of the auxiliary source and thus insures the formation of said vacuum by the expenditure of much less degree of energy, and finally cutting off said column of liquid entering the hydraulic machine from the auxiliary source of supply when the vacuum shall have been completely established.

My invention consists further in the combination with a hydraulic machine of a main source of liquid supply located at a relatively distant point from said hydraulic machine, from which source the liquid is conveyed, raised or transferred in the continued operation of the hydraulic machine by means of a vacuum, and an auxiliary or supplemental source of liquid supply located relatively nearer to the hydraulic machine than the main source of liquid supply, whereby the formation of the necessary vacuum to successfully act upon the main source of supply is first established invariably and at a much less pressure in the preliminary stages of operation by the action upon the relatively nearer auxiliary source.

I have shown my invention as employed in conjunction with an injector adapted to supply water to a steam boiler, reference being had to the accompanying drawing, in which the figure is a side elevation of a steam boiler showing an injector adjusted in position, the main reservoir or source of water supply being shown in section.

A, designates the steam boiler and B, the injector, shown adjusted in position and connected by the steam supply pipe D with the steam dome E.

H, designates a water supply pipe leading from the main reservoir or source of supply J to the injector B.

K, is a branch connecting pipe communicating with the water supply pipe H at K², an auxiliary supply pipe L extending to and within the auxiliary or supply reservoir M, a regulating and cut off valve being interposed at the point of juncture between the auxiliary supply pipe L and the connecting pipe K.

It will be observed that the auxiliary source of supply L is in much closer proximity to the injector D than the main source of supply J, so that the valve N being open in the first or preliminary stages of operation of the injector the action is upon the body of water in the auxiliary reservoir M.

Heretofore in the operation of injectors much difficulty has been experienced in obtaining a preliminary vacuum sufficient to raise the water from the main reservoir, owing to the fact that the steam heats the parts to such an extent as to prevent proper condensation, this being more especially the case when the supply is distant from the injector, and thus in many instances requiring that the parts should be manually cooled by the pouring of cold water upon the exterior of the injector. So also in the preliminary stages of operation it is the fact that a much greater head or pressure of steam is necessary to effect a formation of the requisite vacuum to transfer or raise the water from the main reservoir in the first instance than in the continued action of the injector, which is sometimes very detrimental and dangerous, since if the steam pressure in the boiler is low, disastrous results might follow from an increase of the steam pressure to operate or start the injector, as the increase of steam pressure would decrease the amount of water in the boiler.

In my apparatus the operation of the injector is assured in each case since the preliminary vacuum acts upon a source of supply in such close proximity as that a body of water is instantly raised to commingle with the steam and establish a proper vacuum to ultimately act upon the body of water in the main reservoir at a distance, the communication with the auxiliary source being closed when the proper vacuum has been created. It is also apparent that if by reason of variations in boiler pressure or from any other cause the injector should cease to feed that communication may be again established with the auxiliary source to re-establish the necessary vacuum.

By the use of this apparatus, since the same boiler pressure is sufficient to start the injector as to continue the operation of the same I effect a saving, and also provide means by which water may be fed to the boiler when the water level therein is low without increasing the steam pressure.

This apparatus may be utilized and applied to other hydraulic machines designed to raise, convey or transfer liquids by a vacuum as an instance of which I may cite the steam pump in which frequently it becomes necessary to "prime" the valves manually in order to effect a preliminary starting of the pump. So also in this instance the initial steam pressure may be the same as that employed in the continued operation of the pump.

Having thus described my invention, what I claim as new therein, and desire to secure by Letters Patent of the United States therefor, is—

An improved steam injector comprising a main pipe affording continuous communication between the injector and the main water supply, a branch pipe between the injector and the main water supply and communicating with the said main pipe, a supplemental source of water supply located below the injector and between said injector and the main water supply and communicating with the branch pipe, and a stop valve in the branch pipe whereby the flow of water through the branch pipe may be cut off after the flow through the main pipe is established, as set forth.

In testimony whereof I have hereunto affixed my signature, this 4th day of March, 1892, at Des Moines, Iowa, in the presence of two witnesses.

NEWTON DODD.

In presence of—
CHAS. C. BULKLEY,
S. H. KEOFOOT.